(12) United States Patent
Desouttter et al.

(10) Patent No.: US 9,738,026 B2
(45) Date of Patent: Aug. 22, 2017

(54) MOLD FOR MOLDING A HOLLOW BODY FROM A PREFORM AND MACHINE COMPRISING SUCH A MOLD

(71) Applicant: DISCMA AG, Hunenberg (CH)

(72) Inventors: Luc Desouttter, Octeville sur Mer (FR); Benoit Picot, Octeville sur Mer (FR); Daniel Diesnis, Octeville sur Mer (FR)

(73) Assignee: DISCMA AG, Hunenberg (CH)

( * ) Notice: Subject to any disclaimer, the term of this patent is extended or adjusted under 35 U.S.C. 154(b) by 78 days.

(21) Appl. No.: 14/768,334

(22) PCT Filed: Jan. 30, 2014

(86) PCT No.: PCT/EP2014/051850
§ 371 (c)(1),
(2) Date: Aug. 17, 2015

(87) PCT Pub. No.: WO2014/124816
PCT Pub. Date: Aug. 21, 2014

(65) Prior Publication Data
US 2016/0001491 A1 Jan. 7, 2016

(30) Foreign Application Priority Data

Feb. 18, 2013 (WO) .................. PCT/IB2013/000427

(51) Int. Cl.
*B29C 49/42* (2006.01)
*B29C 49/48* (2006.01)
(Continued)

(52) U.S. Cl.
CPC .............. *B29C 49/56* (2013.01); *B29C 49/02* (2013.01); *B29C 49/36* (2013.01);
(Continued)

(58) Field of Classification Search
CPC .............. B29C 49/56; B29C 2049/566; B29C 49/4205; B29C 2049/4864; B29C 2049/4892
See application file for complete search history.

(56) References Cited

U.S. PATENT DOCUMENTS 2,269,553 A * 1/1942 Roessler .................. C03B 7/10
425/526
7,384,262 B2 * 6/2008 Netsu ...................... B29C 49/06
425/540
(Continued)

FOREIGN PATENT DOCUMENTS

| CH | WO 2005044540 A1 * | 5/2005 | ............. B29C 49/46 |
| EP | 2202047 A1 | 6/2010 | |
| EP | 2529915 A2 | 12/2012 | |

*Primary Examiner* — Robert B Davis
(74) *Attorney, Agent, or Firm* — Eric J. Sosenko; Jonathan P. O'Brien; Honigman Miller Schwarts and Cohn LLP

(57) ABSTRACT

The invention relates to a mold for molding a hollow body from a preform, the mold defining a molding cavity having the shape of the a hollow body to be molded. The mold including a first part and a second part movable relative to each other between an opened configuration, wherein the preform can be loaded inside the molding cavity, and a closed configuration, wherein the molding cavity is formed. The mold further including a locking element arranged to maintain the mold in its closed configuration in a locked position of the mold. The locking element having at least a sleeve portion arranged around a portion of the first and second parts in the closed configuration such that the sleeve portion surrounds the portion of the first and second parts and prevents the mold from moving towards its open configuration in the locked position of the mold.

17 Claims, 6 Drawing Sheets

(51) Int. Cl.
*B29C 49/56* (2006.01)
*B29C 49/36* (2006.01)
*B29C 49/02* (2006.01)
*B29C 49/58* (2006.01)
B29C 49/06 (2006.01)
B29C 49/12 (2006.01)
B29C 49/68 (2006.01)
B29L 31/00 (2006.01)

(52) U.S. Cl.
CPC .......... *B29C 49/4205* (2013.01); *B29C 49/48* (2013.01); *B29C 49/58* (2013.01); B29C 49/06 (2013.01); B29C 49/12 (2013.01); B29C 49/68 (2013.01); B29C 2049/4864 (2013.01); B29C 2049/4892 (2013.01); B29C 2049/566 (2013.01); B29L 2031/7158 (2013.01)

(56) References Cited

U.S. PATENT DOCUMENTS

| | | | |
|---|---|---|---|
| 2006/0078643 | A1 | 4/2006 | Mitchell et al. |
| 2010/0203187 | A1* | 8/2010 | Schmid .................. B29C 49/56 425/541 |
| 2012/0052147 | A1 | 3/2012 | Stoiber et al. |
| 2012/0161370 | A1 | 6/2012 | Dordoni et al. |

* cited by examiner

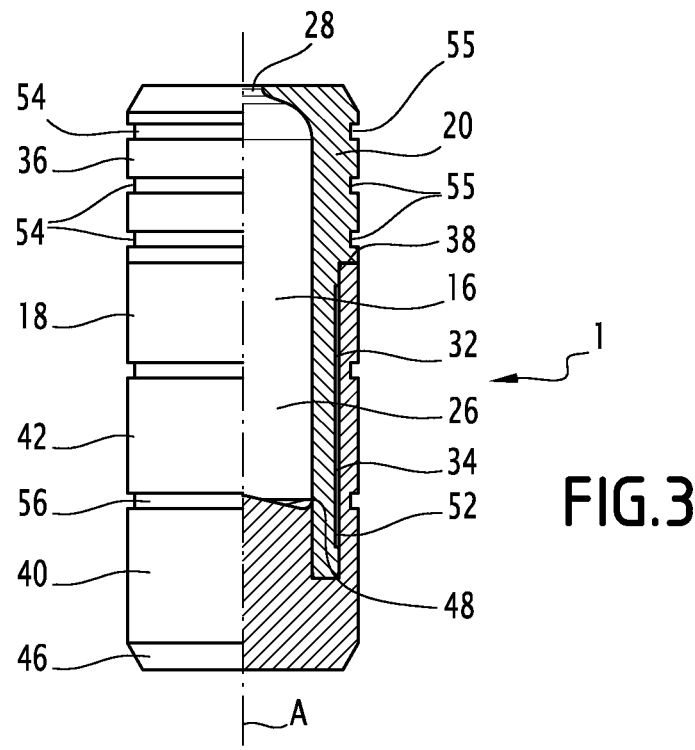
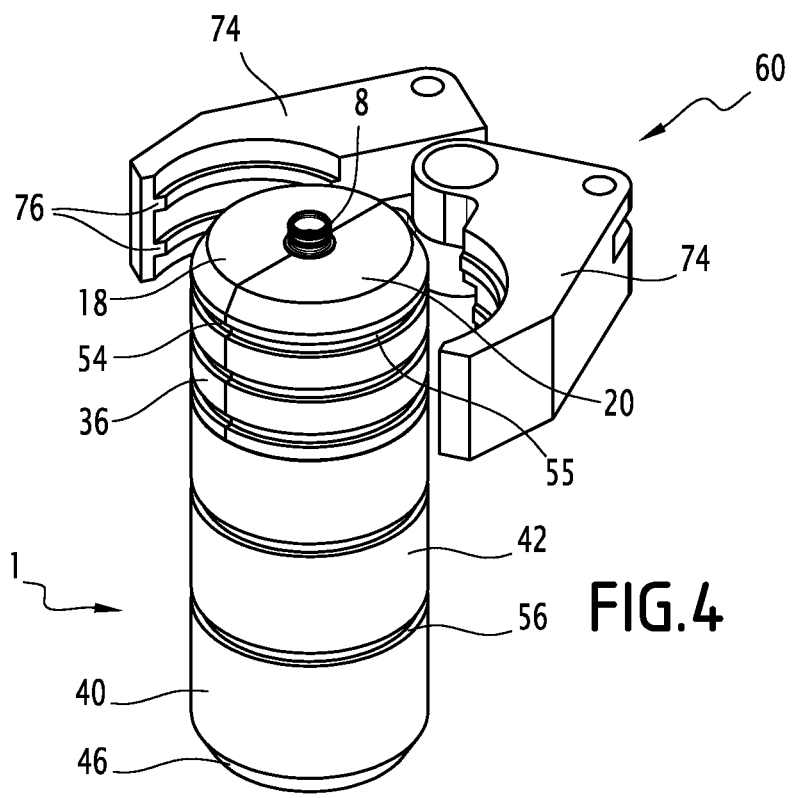

MOLD FOR MOLDING A HOLLOW BODY FROM A PREFORM AND MACHINE COMPRISING SUCH A MOLD

CROSS-REFERENCE TO RELATED APPLICATION

This application is the U.S. national phase of PCT Application No. PCT/EP2014/051850 filed on Jan. 30, 2014, which claims priority to PCT/IB2013/000427 filed on Feb. 18, 2013, the disclosures of which are incorporated in their entirety by reference herein.

TECHNICAL FIELD OF THE INVENTION

The invention relates to a mold for molding a hollow body from a preform. The mold defining a molding cavity having the shape of the hollow body to be molded and comprising a first part and a second part, said parts being movable relative to each other between an opened configuration of the mold, wherein the preform can be loaded inside the molding cavity, and a closed configuration of the mold, wherein the molding cavity is formed. The mold further comprising a locking element arranged to maintain the mold in its closed configuration in a locked position of the mold.

The invention also relates to a machine for producing a hollow body from a preform using such a mold.

BACKGROUND

The invention is for example intended for producing hollow bodies, such as containers, starting from preforms made of plastics material in a so called "hydraulic forming process" or a "blow molding forming process", like blow molding or injection stretch blow molding (ISBM) with a machine adapted to load the preforms in successive molds, to inject a gaseous or liquid fluid in performs heated above the glass temperature of the plastics material, in order to deform the preforms such that they acquire the shape of the molding cavity, and to unload the formed containers from the molds. Conventionally, such machines perform various operations, such as the forming operation or a capping of the containers operation in different stations each having a wheel, or carousel, movable in rotation carrying the molds or the preforms or the containers in order to have a continuous process having a satisfactory throughput.

In such machines and processes, the molds have to be opened frequently to load the preforms and unload the formed containers, while at the same time needing to be firmly locked in the closed configuration in order to prevent the molds from opening during the injection of the fluid at high pressure or during the movement of the molds when they are carried by a wheel at a station of the machine.

In conventional machines, it has been proposed that mold holders attached to the wheel preform the operations of opening, closing and locking the molds. Each mold holder is consequently arranged to open the mold it carries in order to allow the loading of the preform inside the mold, and comprises or is associated with means to close and lock the mold once the preform is loaded, which means are able to maintain the mold closed and locked during the rotation of the wheel and the forming of the container, and finally to unlock and open the mold once again to allow the retrieving of the formed container from the mold. Such mold holders are therefore structurally complicated to enable the opening and the closing of the molds and comprise many parts and recesses. Furthermore, in case of hydraulic forming, the design of the mold holders is constrained due to the fact that they have to be made in stainless steel or any other non-corrosive material or coating, to cope with the wet environment and the necessary cleaning procedures. The mold holding units also have to withstand the inertia at high revolution speed, which not only depends of the wheel diameter, but also on the increased weight compared to air forming because of the product contained in the preforms and formed containers. Furthermore, hydraulic forming allows high forming pressures, for example as high as 50 bars, thus creating a very good print of the container formed, but also creating a very high level of mechanical constraints on the mold holding units. The mechanical shocks due to opening and closing of the mold holders also have to be considered when designing these units. All these restrictions make the mold holders very cumbersome, which limits the number of mold holders carried by the wheel and increases the distance, or pitch, between successive mold holders on the wheel.

Therefore, in order to have a satisfactory throughput at the forming station, it is necessary to increase the speed of rotation of the wheel, which increases the centrifugal force in the wheel and can lead to spilling the fluid injected in the preforms. Indeed, if peripheral speed is too high, at the end of the forming process, when the forming nozzle is moved up, centrifugal force may force the liquid to spill on top of the mold cavities. This is particularly problematic in case of hydraulic forming because the spilled liquid will soil the mold and the mold holder. The mold holder is hard to clean due to its complicated structure, and cleaning the mold holder implies stopping the rotation of the wheel and therefore reduces the throughput of the forming station. An insufficient cleaning of the molds and mold holders can lead to cross-contamination in the hydraulic forming method. Consequently, the speed of rotation of the wheel is necessarily limited in order to avoid the above-mentioned problems.

The same problems may rise in other fields than the forming of containers, as soon as a hollow body is to be produced from a preform placed in a mold.

One of the aims of the invention is to solve the above-mentioned problems by proposing a mold and a machine of simpler structures, the mold being adapted to cooperate with a more compact and simpler mold holder.

SUMMARY OF THE INVENTION

To this end, the invention relates to a mold of the aforementioned type, wherein the locking element comprises at least a sleeve portion, said sleeve portion being arranged around a portion of the first and second parts in the closed configuration such that said sleeve portion surrounds said portion of the first and second parts and prevents the mold from moving towards its open configuration in the locked position of the mold.

The locking of the mold in its closed configuration is performed by the locking element which is engaged on the mold. Therefore, the locking of the mold is no longer performed by a mold holder, which can be simplified and made more compact. It is therefore possible to increase the number of mold holders on a wheel of the machine, thereby improving the throughput of the machine. Furthermore, the locking element of the mold has a very simple structure, which makes it compact and easy to engage and disengage on and from the first and second parts of the mold.

According to Other Features of the Mold According to the Invention:

the locking element further comprises a bottom portion, closing the sleeve portion at one end thereof, the first and second parts resting on said bottom portion in the locked position;

the bottom portion forms a part of the molding cavity and closes said molding cavity in the locked position;

the hollow body to be molded is a container having a neck, a body and a bottom, and wherein the hollow recesses of the first and second parts, when in closed configuration, define the shape of the body of the container and the bottom portion comprises a bottom face having the shape of the bottom of the container to be formed;

the first and second parts each comprise a hollow recess having the shape of a part of the hollow body to be produced, the hollow recesses of said parts facing each other and defining together the molding cavity of the mold in the closed configuration;

the first and second parts define a cylindrical outer contour in the closed configuration, the sleeve portion having an inner opening having the shape of a portion of said cylindrical outer contour, the sleeve portion being substantially complementary to the portion of the first and second parts it surrounds in the locked position;

the first and/or the second parts comprise at least one first groove, extending on the outer face of the mold in its closed configuration outside the portion surrounded by the sleeve portion, and the sleeve portion of the locking element comprises at least one second groove extending on the outer face of said sleeve portion; said grooves, being arranged to cooperate with a mold holder in order to maintain the mold in the locked position.

The invention also relates to a machine for producing a hollow body form a preform, said machine comprising at least one mold holder of a first type and one mold as described above, wherein the mold holder of the first type comprises means for maintaining the sleeve portion of the locking element of the mold around a portion of the first and second parts) of the mold in the closed configuration in order to maintain the mold in its locked position.

The mold holder of the machine cooperates with the mold in order to maintain it in the locked position. This cooperation can be performed in a very simple manner, which reduces the bulk of the mold holder and of the mold compared to conventional mold holders comprising locking means to maintain the mold in the closed configuration.

According to Other Features of the Machine According to the Invention:

the mold holder comprises at least a first protrusion and a second protrusion, said protrusions being engaged in the first and second grooves of the mold, when said mold is carried by the mold holder, in order to retain the mold in the mold holder according to the axial direction of the mold and to maintain the mold in its locked position;

the mold holder is mounted on a wheel movable in rotation around an axis substantially parallel to the axial direction of the mold;

the mold holder further comprises means for holding the mold in the mold holder according to a radial direction of the wheel;

the means maintaining the mold in the radial direction comprise a sleeve, movable between an unlocking position wherein the mold can be introduced in the sleeve and a locking position wherein the sleeve surrounds the mold in order to prevent its movement according to a radial direction of the wheel;

the machine further comprises at least one mold holder of a second type, said mold holder of a second type comprising two jaws movable relative to each other and arranged to cooperate with the first and second parts respectively, said jaws being able to move the first and second parts between the opened and closed configuration of the mold;

the machine is a machine for producing containers from preforms, comprising at least a container forming station for forming the containers, said forming station comprising means for injecting a gaseous or liquid forming fluid inside the performs placed in molds such that the injection of the fluid deforms the preforms, which acquire the shape of the molding cavity, said forming station comprising a plurality of mold holders.

BRIEF DESCRIPTION OF THE DRAWINGS

Other aspects and advantages of the invention will appear upon reading the following description, given by way of example and made in reference to the appended drawings, wherein:

FIG. 3 is a diagrammatical side view of the mold of FIG. 2 in the closed and locked position, a part of the mold being cut-away FIG. 4 is a diagrammatical view in perspective of a mold in the closed and locked position, released from a mold holder.

DETAILED DESCRIPTION OF THE INVENTION

Figure 1:
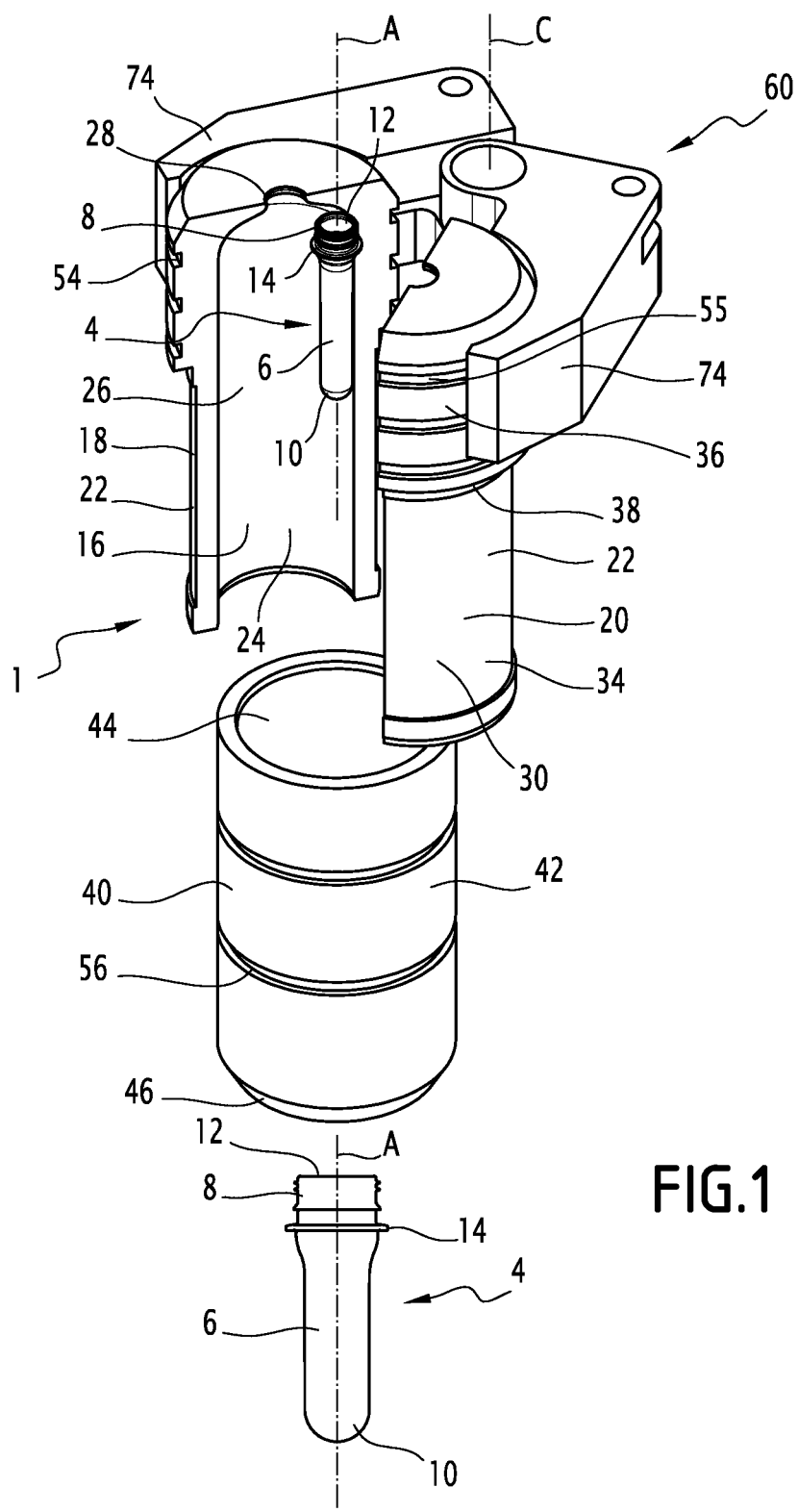
FIG. 1 is a diagrammatical view in perspective of a mold according to the invention in the opened and unlocked position, said mold cooperating with a mold holder.

This invention provides a machine for producing hollow bodies, such as, for example, containers, preferably shaped containers, from preforms.

As used herein, the term "container" relates to a container for storing a consumable. Containers have an internal cavity defined by an interior surface of the container walls. The internal cavity defines the storage volume of the container. For beverages, single serve containers having a storage volume from about 100 to about 500 milliliters, multi-serve containers having a volume from about 500 to about 3000 milliliters, as well as large containers having volumes from about 3000 milliliters to about 30 liters and more are generally known. For other applications such as storage of liquid drugs, smaller container sizes are also known. For yet other applications such as fuels, larger container sizes are known. The interior cavity of the container is accessible from the outside through an opening. The opening may be closable by a closure such as a cap or a lid. The closure may be an integral part of the container and movably connected to the outer wall of the container for example by means of a hinge. The closure may also be a separate part that is not permanently attached to the container such as screw top or a crown. The closure may be reversibly attachable to the container for repeated opening and closing of the container. The closure may comprise a movable part that can be moved by the user from an open position to a closed position such as a sports cap.

The shape of the container is defined by the outer surface of the container walls. In principal, the container can have any size and shape. The container may have a top portion including the opening, a bottom portion opposite the top portion, and a center portion, named body, connecting top and bottom portion. The dimension from the top portion to the bottom portion of the container is generally referred to as the longitudinal dimension. The container may comprise a neck portion surrounding the opening and a shoulder portion connecting the neck portion with the side walls. The container may comprise a base for placing the container on a surface. The base may form part of the bottom portion. When placed on a surface, the base of the container is in contact with the surface at least three points. The base may also be in contact with the surface along a standing surface such as a standing ring. The side walls connect the base of the container with the container walls in the top portion.

As used herein, the term "shaped containers" refers to containers offering at least partially resistance against a change in geometric shape. For example, a simple plastic pouch is not a shaped container while a plastic bottle is a shaped container. Shaped containers can virtually take any shape including the shape of a bottle, a canister, a box, a keg, or a barrel. The resistance against deformation by external forces can be different for various parts of the container and in different direction of a container. Many containers, such as bottles, have a longitudinal dimension that is substantially larger than any transverse dimension. Often, the resistance to deformation in the longitudinal direction is much larger than the resistance to change in the transverse direction so that the containers are stackable for bulk transport.

As used herein, the term "preform" refers to any piece of material than may be converted into a container by forcing a fluid medium at elevated pressure into it. The preform may have a hollow body and a neck portion with an opening for accessing the internal volume of the preform. A preform may have a shape similar to that of a test tube being closed at lower end and having the neck with the opening at the upper end. The preform may be made from any suitable plastic materials, such as polyesters, such as polyethylene terephthalate (PET), polyethylene naphthalate (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), acrylonitrile butadiene styrene (ABS) or other polymers, such as polyvinyl chloride (PVC).

The preforms may generally be produced according to an injection molding process and be molded at a site different from the site where the machine for forming containers according to the present invention is located. In a variant, the preform production platform, such as injection molding, compression molding or injection compression, is integrated in the machine. In this case, the perform production process is conducted such that the body of the perform remains as close as possible to its optimal processing temperature, whereas the neck part is kept at a temperature as close as possible to ambient temperature to prevent from later distortion. In this case, the heating station can be replaced by the preform production platform and the treatment station(s) is placed downstream of the preform production platform. A heating station can however be arranged downstream of the preform production platform in order to submit the preforms to an additional thermal conditioning to optimize the heating profile of the preforms and/or to ensure the activation of the decontamination media optionally introduced in the preforms in the treatment step(s).

A suitable process for converting a preform into a container is to provide a heated preform, preferably heated above the glass transition temperature of the preform material, and to force a fluid medium through into the preform at an elevated pressure. The fluid medium then causes the body of the preform to expand. During the expansion, the preform may be placed into a mold such that the body expands until it reaches and conforms to the interior surfaces of the mold. After cooling down, the body of the preform remains in the expanded configuration, now forming a container. By suitable forming the interior surfaces of the mold, the form of the container may be determined. During the expansion of the preform through the opening, the neck portion may remain relatively unchanged. Suitable fluid media for expanding preforms include gaseous media such as pressurized air (blowing) as well as liquid media such as water (hydraulic forming or hydroforming).

As used herein, the term "mold" refers to any body having an internal cavity defined by interior surfaces. A mold may comprise an opening for accepting and holding the neck portion of the preform. When the preform is placed into the mold, the opening of the preform can be accessed from outside the mold. A mold generally comprises at least two complementary parts which can be moved from a first closed configuration to a second open configuration. The preform is expanded when the mold parts are in the closed configuration such that the closed mold limits the expansion of the preform to the desired container geometry. In the opened configuration, the preform can be placed into the mold cavity and the finished container can be removed after the expansion. A mold may comprise further parts such as a base mold which is longitudinally movable with respect to the above mentioned complementary parts and contains the imprint of the container base.

In the following description, the mold and machine according to the invention will be described in relation with a hydraulic forming method of containers. However, it is to be understood that the invention is not limited to hydraulic forming and can also be applied to air forming of containers, as well as to other fields than the forming of containers. The mold and machine according to the invention can be applied to the forming of any hollow body from a preform of said hollow body.

In the description, the terms "upstream" and "downstream" are defined relative to the direction of circulation of the preforms and of the formed containers in the machine according to the invention.

Preferably, the machine of the present invention comprises a plurality of molds for converting preforms to containers. By providing a plurality of molds, the machine of the present invention is able to convert preforms into containers at a higher throughput because the conversion of a plurality of preforms can be handled in parallel as follows. A first heated preform is placed into the first mold. While the expansion of the first preform is started, a second heated preform is loaded into the second mold and so forth. The first mold is used again after the previous container has been removed from it. To allow parallel expanding of preforms in a plurality of molds in a continuous process, the individual molds may be transported along a closed-loop manufacturing path. The time required for expanding the heated preform and removing the container cannot be shortened below a certain value, taking into account some mechanical limits of the equipment or some technical constraints due to the plastic material itself. Accordingly, each mold can only be used a limited number of times per hour. Further increasing the throughput of the machine thus requires using more molds and using them in parallel. To accommodate the increased number of molds, the manufacturing path has to be extended and the molds have to be transported along the manufacturing path at a higher speed.

The machine of the present invention comprises a mold loading station for placing successive preforms into successive molds, each mold forming a mold cavity having the shape of the container to be produced.

Preferably, the preforms are supplied to the mold in a form ready for being expanded such as by having a temperature above the glass transition temperature of the preform material. The preforms may be supplied from a heating station comprising a transportation means for transporting the preforms through the heating station along a predetermined path in a continuous process. Suitable heating stations such as ovens for preparing and supplying heated preforms are well known.

Optionally, before undergoing the heating step described before, the preforms can be decontaminated or cleaned, for example to remove dust, or exposed to ultraviolet radiations or submitted to combined or successive treatments. In this case, the machine may comprises one or several appropriate station(s) for performing this or these treatments located upstream of the heating station. The heating station can then be arranged to apply a temperature profile ensuring the activation of the decontamination media optionally introduced in the preforms in the treatment step(s).

The machine of the present invention further comprises a forming station for forming the containers by injecting a gaseous or liquid fluid into the preform contained in each mold in order to deform said preform such that each preform acquires the shape of the container defined by the mold cavity.

The forming station may comprise a mold transportation means for transporting the successive molds along a manufacturing path. The transportation means may be in the form of a wheel rotating around its central rotational axis and transporting the molds along its circumference. Preferably, the rotational axis of the transportation means of the forming station is substantially parallel to the rotational axis of the transportation means of the mold forming station.

The forming station may comprise a nozzle for engaging with the opening of the preform contained in the mold and for injecting the pressurized fluid into the preform causing it to expand. The forming station may comprise a plurality of such nozzles successively engaging with preforms contained in successive molds.

The molds have an open configuration, which is only needed for some time when the mold is loaded and unloaded in the mold loading station. During the forming step when the mold is in the forming station, the mold has to remain in the closed configuration.

The machine of the present invention may further comprise a closing station for closing the containers formed at the forming station, preferably while the containers are still being held inside the mold. Preferably, the closing station is arranged between the forming station and the mold unloading station. The closing station may comprise means applying a lid to the neck portion of the container. The closing station may comprise transportation means for transporting the molds along the manufacturing path. The transportation means may be in the form of a wheel rotating around its central rotational axis and transporting the molds along its circumference. The transportation means may comprises suitable holding means for holding molds along its circumference. The rotational axis of the transportation means may preferably be substantially parallel to some or all other rotational axes of the machine. The transportation means may also be a chain for transporting a plurality of molding means.

In the following the machine and process of the present invention are described with reference to more specific and embodiments and the figures. It is to be understood that, while some features may be described only in connection with one embodiment, these features may be readily transferred to some or all embodiments of the invention.

Figure 2:
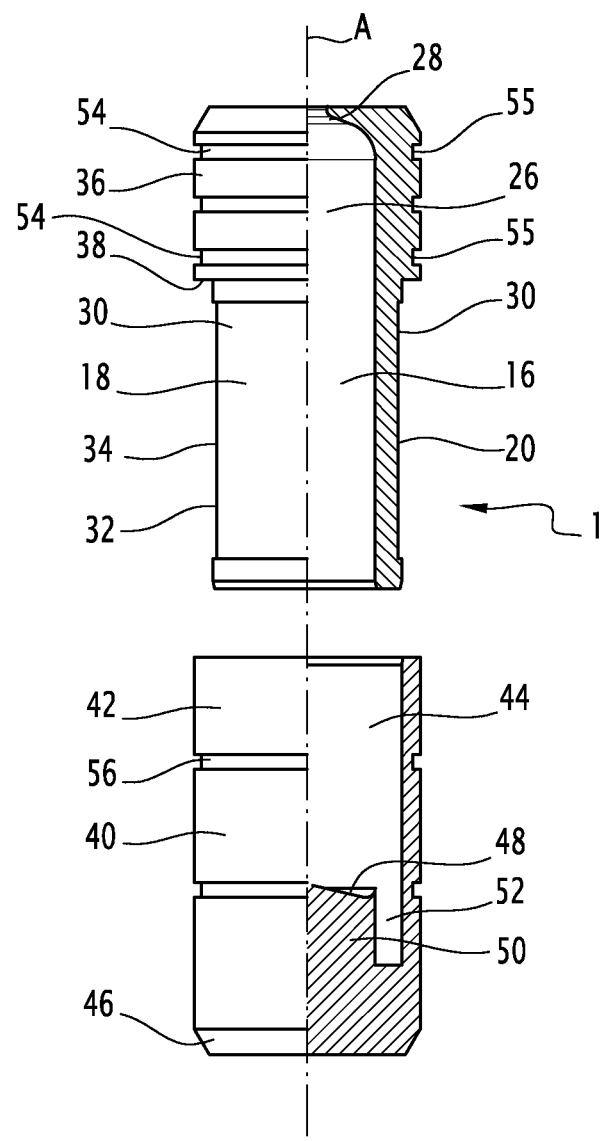
FIG. 2 is a diagrammatical side view of the mold of FIG. 1 in the closed and unlocked position, a part of the mold being cut-away.

FIGS. 1 to 3 show a mold 1 for forming hollow bodies, here containers 2, such as bottles (visible on FIGS. 6 and 7), for example bottles containing water or carbonated water based drinks, starting from a preform 4.

Each preform 4 comprises a body 6 in the general shape of a tube of U-shaped longitudinal section, which is closed at one end and the other end of which already has the final shape of the neck 8 of the container 2. In FIG. 1, a preform 4 is shown, by way of non-limiting example, having a cylindrical body 6 extending along a substantially vertical axis A which coincides with the axis of the neck 8. The lower end 10 of the body 6 is closed and has the general shape of a hemisphere, while the upper end of the preform 4 forms the neck 8, which defines an inner opening 12 and which is, adapted on its outside periphery to receive a lid or a cap, for example by screwing. Below the neck is an external flange 14 that is used to hold or transport the perform 4 or the container 2. The preforms 4 are generally produced according to an injection molding process and molded at a site different from the site where the machine for forming containers 2 is located.

Each preform is intended to be loaded in a mold 1, which defines a molding cavity 16 having the shape of the hollow body, here the container 2, to be formed. The mold 1 comprises a first part 18 and a second part 20 movable relative to each other, between an opened configuration (FIG. 1) and a closed configuration (FIGS. 2 to 4). In the opened configuration, the two parts 18 and 20 are spaced from each other such that the preform 4 can be placed between said parts, while in the closed configuration, the two parts 18 and 20 are applied against each other such that the preform 4, placed between the parts 18 and 20 in the opened configuration, is maintained between the two parts 18 and 20, resting on the top surface of the mold by means of its flange 14. According to the embodiment shown in the figures, the first and second parts 18 and 20 are distinct from each other, i.e. they are not linked together. In a variant, the two parts 18 and 20 can be hinged together. The movement between the opened and closed configurations is for example a rotation movement around an axis B substantially parallel to the axis A of the preform 4.

Each part 18 and 20 comprises a body 22 comprising, on its inner face, a hollow recess 24 having the shape of a half container to be formed. According to the embodiment shown in FIG. 1, the hollow recess 24 of one part 18 comprises a semi-cylindrical portion 26, opened at its lower end and terminated at its upper end by a semi-circular opening 28 of a diameter substantially complementary to the diameter of the preform 4 below its flange 14. The hollow recess of the other part 20 of the mold 1 is symmetrical to the hollow recess 24 described above.

Figure 5:
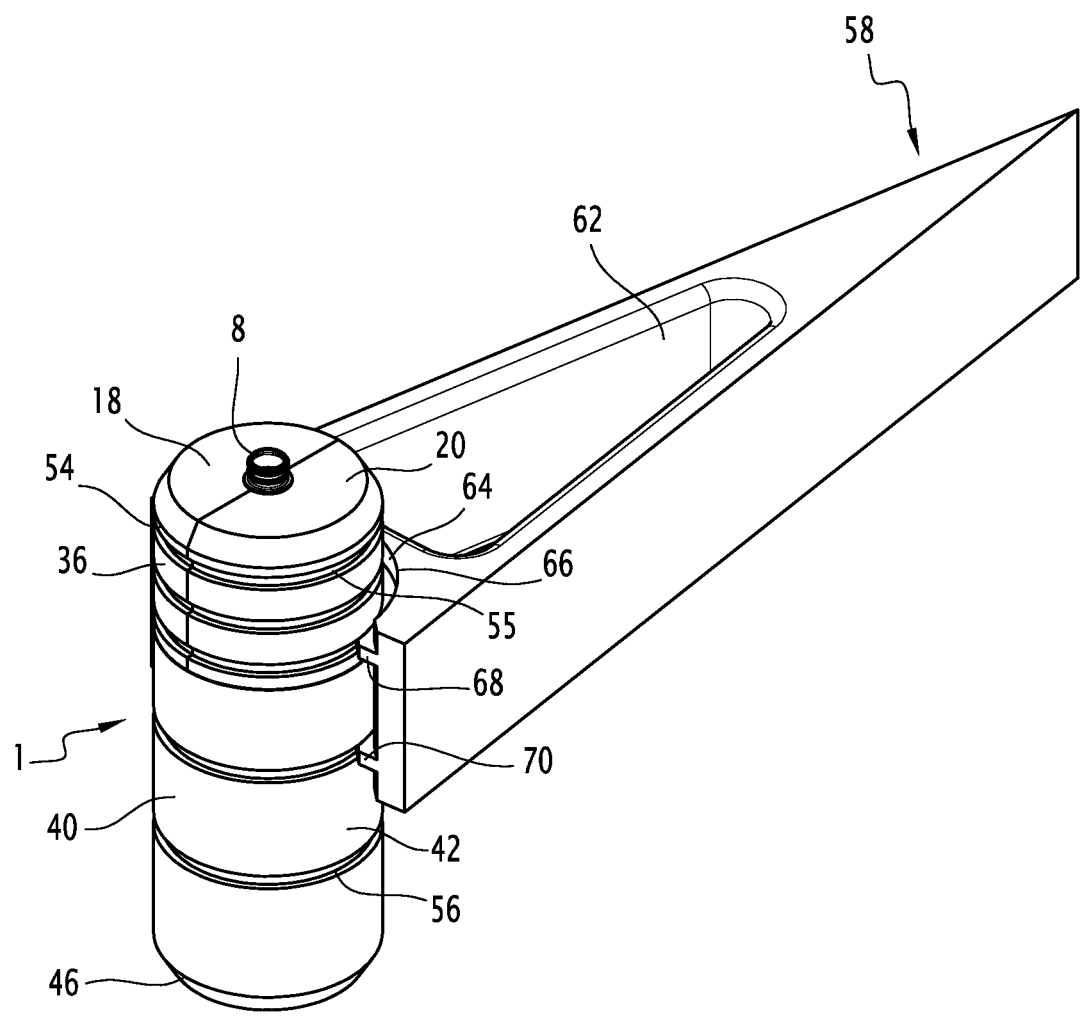
FIG. 5 is a diagrammatical view in perspective of the mold of FIG. 4 cooperating with another mold holder during the loading of the mold in said mold holder.
Figure 6:
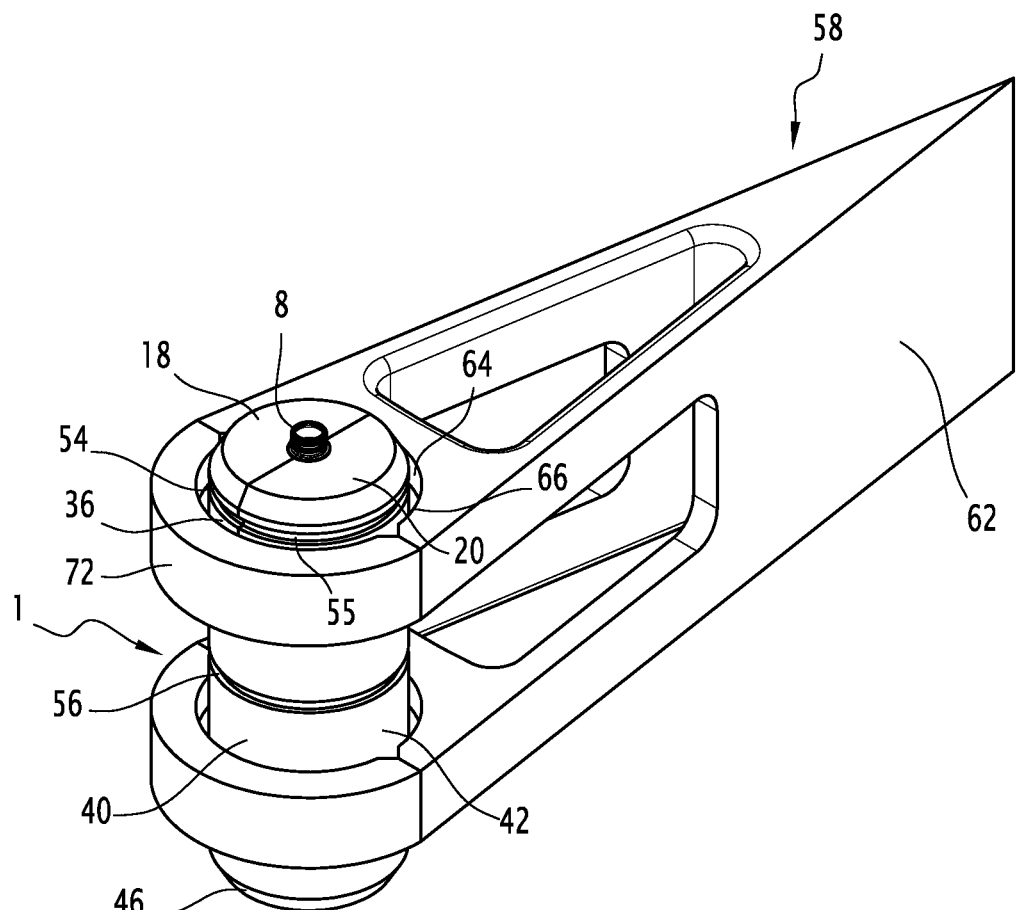
FIG. 6 is a diagrammatical view in perspective of the mold and mold holder of FIG. 5, the mold holder maintaining the mold locked in all directions, and FIG. 7 a diagrammatical view showing the molds and containers at different stages during the method for forming containers using a machine according to the invention.

In the closed configuration, the two parts 18 and 20 are applied against each other, such that the hollow recesses 24 face each other and define together the molding cavity 16 having the shape of the container 2 to be formed. The molding cavity 16 therefore comprises a cylindrical portion extending according to axis A of the preform 4, defined by the semi-cylindrical portions 26 of the recesses 24 and intended to form the body of the container 2, opened at its lower end and terminated at its upper end by an opening, substantially complementary to part of the body 6 of the preform 4, which is immediately below its flange 14. When the mold is closed, the preform 4 is held in the molding cavity 16 with its flange applied above the opening 28 of the molding cavity, as shown in FIGS. 4 to 6.

The outer face 30 of the body 22 of each part 18 and 20 is substantially semi-cylindrical such that in the closed configuration the first part 18 and the second part 20 have a cylindrical outer contour 32, as shown in FIGS. 2 and 3. The outer faces 30 of the bodies 22 of the first and second parts 18 and 20 are arranged such that the outer contour 32 comprises a lower portion 34 having a first diameter and an upper portion 36 having a second diameter, greater than the first diameter. The lower portion 34 and the upper portion 36 are joined to each other by a shoulder 38 extending substantially radially in a plan substantially perpendicular to axis A.

The mold 1 further comprises a locking element 40 arranged to maintain the mold 1 in its closed configuration when the locking element 40 is engaged on the first and second parts 18 and 20 in a locking position, wherein the mold is locked in closed configuration, as shown in FIGS. 3 to 6.

The locking element 40 comprises a sleeve portion 42 intended to be engaged on the outer contour 32 of the first and second parts 18 and 20 in its locking position in order to prevent the mold 1 to move towards its opened configuration when the sleeve portion 42 is engaged in the locking position. The sleeve portion 42 is substantially cylindrical and comprises an inner opening 44 opened at its upper end to allow the introduction of the first and second parts 18 and 20 in the locking position in the inner opening 44, as shown in FIG. 3. The diameter of the inner opening 44 is substantially equal to the diameter of the lower portion 34 of the outer contour 32 and the inner opening 44 is substantially complementary to said lower portion 34. In the locking position, the lower portion 34 of the outer contour 32 is engaged in the inner opening 44 and the shoulder 38 comes into abutment on the upper end of the inner opening 44 such that the upper portion 36 of the outer contour 32 extends above the sleeve portion 42, in the continuity of said sleeve portion 42 as shown in FIGS. 3 to 6. Therefore, in its locking position, the locking element 40 locks the first part 18 and the second part 20 in the closed configuration and prevents them to move towards the opened configuration. The outer diameter of the sleeve portion 44 is for example substantially equal to the diameter of the upper portion 36 of the outer contour 32 such that, in the closed configuration, the mold 1 has a substantially cylindrical shape of circular cross-section.

The locking element 40 further comprises a bottom portion 46 closing the sleeve portion 42 at its lower end. In the locking position of the locking element 40, the first and second parts 18 and 20 rest on the bottom portion 46. The bottom portion 46 and the shoulder 38 prevent any movement of the first and second parts 18 and 20 relative to the locking element 40 in the axial direction.

According to the embodiment shown in the figures, the bottom portion 46 forms a part of the molding cavity 16 and comprises a bottom face 48 having the shape of the bottom of the container to be formed, as shown in FIGS. 2 and 3. The bottom face 48 closes the lower end of the inner opening defined by the bodies 22 of the first and second parts 18 and 20 when said parts are engaged in the sleeve portion 42, as shown in FIG. 3. In the closed configuration, while the locking element 40 is in its locking position, the molding cavity 16 is therefore delimited by the bodies 22 of the first and second parts 18 and 20 and by the bottom face 48 of the locking element 40. The molding cavity 16 remains opened at its upper end, where the opening 28 is located. This opening is closed by flange 14 at the bottom of the neck 8 of the preform 4, when said preform is placed in the mold 1.

The fact that the bottom of the container is formed by the bottom face 48 of the bottom portion 46 of the locking element 40 enables to easily change the shape of the bottom of the container, without having to modify the first and second parts 18 and 20 of the mold 1, but simply by making them cooperate with a different locking element 40.

According to the embodiment shown in FIGS. 2 and 3, the bottom face 48 is formed by the upper end of a protrusion 50 extending axially in the inner opening 44 of the sleeve portion 42. The protrusion 50 is spaced from the wall of the inner opening 44 by a groove 52 having a width substantially equal to the wall thickness of the lower portion 34 of the outer contour 32 defined by the first and second parts 18 and 20 in the closed configuration. As shown in FIG. 3, the groove 52 receives the lower end of the lower portion 34 when the locking element 40, when said element is in its locking position. By modifying the height of the protrusion 50, it is possible to modify the volume of the container to be produced, without modifying the first and second parts 18 and 20.

Therefore, it is possible to produce various containers with the same first and second parts 18 and 20 simply by changing the shape of the locking element 40.

It is to be understood that the shape of the mold 1 described above is given by way of example and that said shape is dependent on the hollow body to be produced. The hollow recesses 24 of the two parts 18 and 20 are not necessarily symmetrical. According to a variant, the molding cavity 16 can be formed by the first and second parts 18 and 20 only and not by the locking element 40 as described previously. In this case, the locking element 40 can be formed by a sleeve portion only and not necessarily comprise a bottom portion as described previously.

The first part 18 comprises at least one first groove 54 extending substantially radially on the outer face of said part. More particularly, the first groove 54 extends in the upper portion 36 of the first part 18, all around said first part. According to the embodiment shown in the figures, the second part 20 also comprises a first groove 55 extending substantially radially on the outer face and in the upper portion 36 of said part 20. The first groove 55 of the second part 20 extends in regard of the first groove 54 of the first part 18, such that, in the closed configuration of the mold, the first grooves 54, 55 extend substantially radially all around the upper part 36 of the outer contour 32 defined by the first and second parts 18 and 20 of the mold 1.

Likewise, the locking element 40 comprises at least one second groove 56 extending substantially radially on the outer face of the sleeve portion 42 of the locking element 40. The second groove 56 therefore extends all around the sleeve portion 42 and is substantially parallel to the first grooves 54, 55.

According the embodiment shown in the figures, the first and second parts 18 and 20 comprise a plurality of first grooves 54, 55 distributed axially on the upper portion 36 and the locking element 40 comprises a plurality of second grooves 56 distributed axially on the sleeve portion 42.

The first and second grooves 54, 55 and 56 are used for the transportation of the mold 1 and to maintain the mold 1 in a firmly closed configuration in cooperation with mold holders, as will now be described.

The mold 1 is used in a machine for molding a hollow body 2, such as a container or a bottle, from the preform 4 of said hollow body 2.

In the case of a machine for forming containers 2 via a hydraulic forming method, the machine for example comprises the following stations:
- a heating station, wherein a heating profile is applied to the preforms 4 in order to allow their subsequent deformation,
- a loading station, wherein the preforms 4 are loaded into molds 1 as described above,
- a forming station, wherein a liquid is injected in the preforms 4, via a nozzle arranged to inject the liquid in the inner opening 12, the liquid injection causing the preforms 4 to deform and to acquire the shape of the molding cavity 16, i.e the shape of the container to be produced,
- a capping station, wherein the formed containers are closed by screwing or clipping a cap on the neck 8 of the container.
- an unloading station, for example formed by the loading station, wherein the filled and closed containers are retrieved from the molds,
- various transfer stations arranged to transfer the preforms 4 and the formed containers 2 between the stations of the machine.

In a variant, wherein the machine for forming containers 2 implements a blow forming method, the machine for example comprises the following stations:
- a heating station, wherein a heating profile is applied to the preforms 4 in order to allow their subsequent deformation,
- a loading station, wherein the preforms 4 are loaded into molds 1 as described above,
- a forming station, wherein pressurized gas is injected in the preforms 4, via a nozzle arranged to inject the pressurized gas in the inner opening 12, the gas injection causing the preforms 4 to deform and to acquire the shape of the molding cavity 16, i.e the shape of the container to be produced,
- a filling station;
- a capping station, wherein the filled containers are closed by screwing or clipping a cap on the neck 8 of the container,
- an unloading station, for example formed by the loading station, wherein the filled and closed containers are retrieved from the molds,
- various transfer stations arranged to transfer the preforms 4 and the formed containers 2 between the stations of the machine.

Such machines are known per se and will not be described in detail herein. The structure described above is given by way of non limiting example and these machines can comprise more or less stations or be submitted to various modifications.

Figure 7:
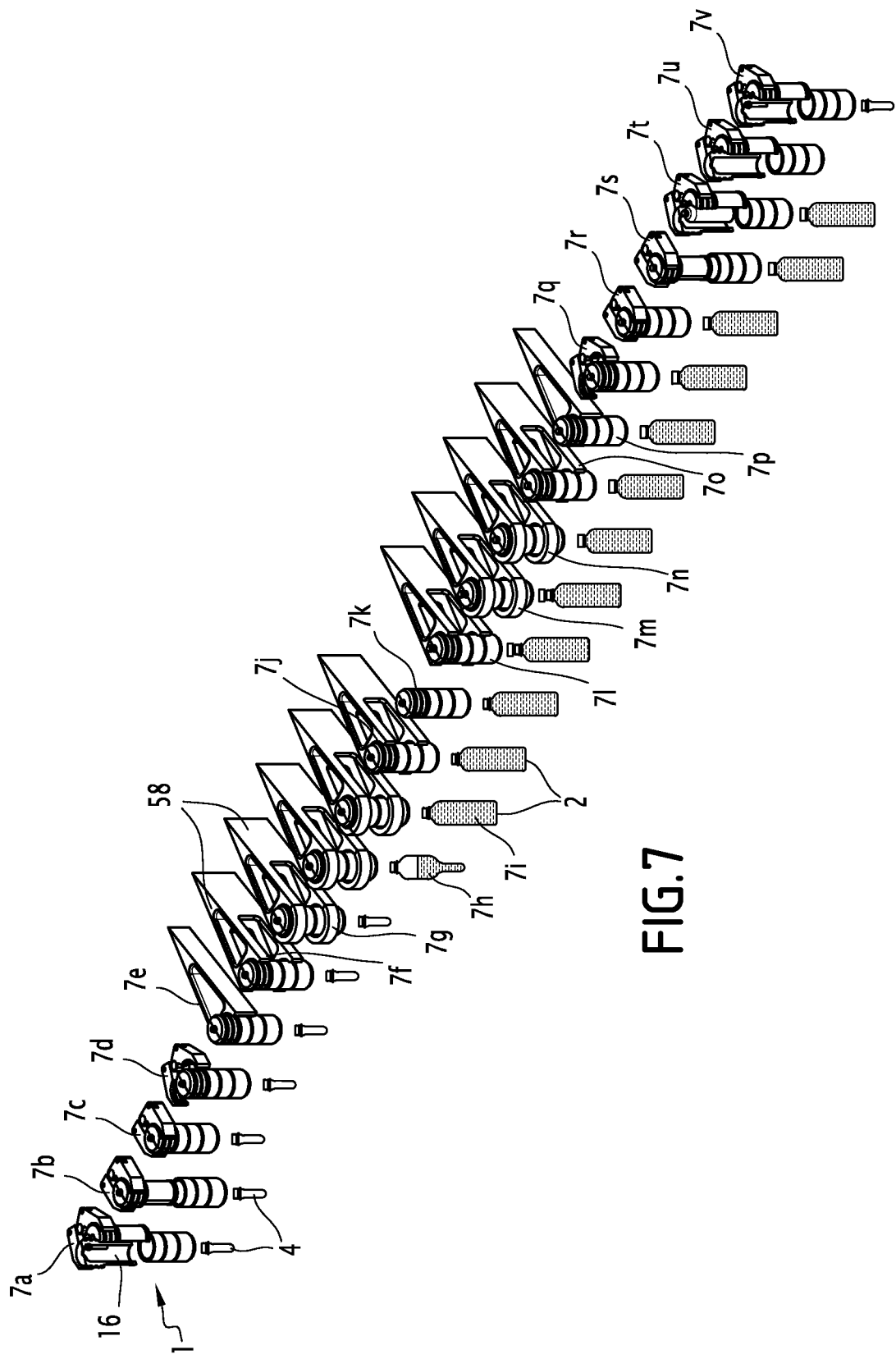

According to the embodiment shown in FIG. 7 and described hereunder, the preforms 4 and the formed containers 2 are transported in the machine in the molds 1 described above, meaning that the molds 1 carry the preforms 4 and containers 2 during their displacements in the various stations of the machine. Such an embodiment is particularly advantageous since it enables to eliminate the risks of distorting or breaking the preforms or containers during their transportations when said preforms or containers are carried by their necks only. The preforms and containers are also able to sustain greater rotation speeds and centrifugal forces when they are protected by a mold, which allows increasing the speed of the machine and therefore its throughput.

However, the molds 1 according to the invention could also be used with a more conventional machine, wherein the loading, forming and unloading are performed in a single station and wherein the molds are used only in this station, the preforms and containers being transported by their necks in the other stations of the machine.

Each station of the machine generally comprises a wheel, or carousel, movable in rotation around an axis substantially parallel to the axis A of the preforms, i.e. a substantially vertical axis. Each wheel carries a plurality of mold holders, movable in rotation with the wheel, arranged to cooperate with the molds 1 described previously to transport said molds in rotation.

In order to ease to comprehension of the machine, the different wheels of said machine have not been represented, only the mold holders being shown.

Mold holders of a first type 58 (FIGS. 5 and 6) are provided on most of the wheels of the machine, while mold holders of a second type 60 (FIGS. 1 and 4) are provided on the wheel of the loading and unloading station, as shown in FIG. 7.

The mold holders of the first type 58 each comprise an arm 62 extending substantially radially from the wheel and comprising at its free end an imprint 64 adapted to receive the mold 1. The imprint 64 has a substantially semi-cylindrical shape defining a cavity opened and turned radially outward of the wheel. The wall 66 of cavity comprises at least a first protrusion 68 and a second protrusion 70 arranged to engage in the first and second grooves 54, 55 and 56 of the mold 1 respectively, as shown in FIG. 5. The first and second protrusions 68 and 70 are each in the form of an arcuate rib extending from the wall 66 of the cavity toward the centre of the cavity and complementary to the shape of part of the first and second grooves 54, 55 and 56, such that when the first and second protrusions 68 and 70 are engaged in the first and second grooves 54, 55 and 56, the mold is locked in its closed configuration, the locking element 40 being unable to move relative to the first and second parts 18 and 20 along the axial direction.

According to the embodiment shown in FIG. 6, a holding element 72 is provided at the end of the arm 62 when the mold 1 is placed in the imprint 64 in order to holding the mold 1 in the imprint 64 according to the radial direction, during the rotation of the wheel carrying the arm 62. The holding element 72 also comprises protrusions (not shown) engaged in the first and second grooves 54, 55 and 56 of the mold 1 and forms, with the imprint 64, a sleeve movable between an unlocking position (FIG. 5) wherein the mold 1 can be introduced in the sleeve and a locking position (FIG. 6) wherein the sleeve surrounds the mold 1 and prevents any radial movement of said mold 1 relative to the mold holder of the first type 58. The holding element 72 can be hinged to the arm 62 to allow its movement between the opened and closed configuration or can be formed by a separate part placed on the arm 62 by an actuator to place the sleeve in the closed configuration.

Alternatively, the means for holding the mold 1 in the imprint 64 according to a radial direction of the wheel can be formed by operable magnetic means arranged to lock the mold 1 on the protrusions 68 and 70 of the imprint 64. When the magnetic means are activated, the mold 1 is held on the protrusions 68 and 70 and when the magnetic means are deactivated, the mold 1 is free to leave the imprint 64 to move to a subsequent station of the machine.

The mold holders of the second type 60 each comprise two jaws 74 movable relative to each other around axis C and arranged to cooperate with the first and second parts 18 and 20 of the mold 1 respectively. As shown in FIG. 4, the cooperation between a jaw 74 and a part of the mold 1 is for example ensured by protrusions 76 extending in the jaw 74 and able to be engaged in the first grooves 54, 55 of the first and second parts 18 and 20. When the jaws 74 cooperate with the first and second parts 18 and 20, they are able to move said parts 18 and 20 between the opened and closed configurations of the mold 1, as shown in FIG. 1. Therefore, the mold holders of the second type 60 allow the loading of the preforms 4 in the molds and the unloading of the formed containers 2 from the molds 1 by moving the first and second parts 18 and 20 of the molds in their opened configuration when the locking element 40 is released from its locking position. When the molds are in their closed configuration, the movement of the jaws 74 to their opened position leads to protrusions 76 to disengage from the first grooves 54, 55 and to the release of the molds 1, as shown in FIG. 4. The mold holders of the second type 60 are also provided with means (not shown) arranged to move the locking element 40 between the unlocking position, wherein the locking element 40 is disengaged from the first and second parts 18 and 20 (FIG. 1), and the locking position, wherein the locking element 40 is engaged on the first and second parts 18 and 20. Such means are for example arranged to cooperate with the second groove(s) 56 and are movable in translation axially to move the locking element 40 according to the axial direction.

The various steps of the method for forming containers using a machine as described above will now be described in reference to FIG. 7.

First, a preform 4 is loaded in a mold 1 held in the opened configuration by a mold holder of the second type 60 at the loading station, as shown by reference 7a of FIG. 7. The mold 1 is then closed by the moving the jaws 74 of the mold holder of the second type (reference 7b). The mold 1 is then placed in the locked closed configuration by engaging the locking element 40 around the first and second parts 18 and 20, as shown by reference 7c. The jaws 74 are moved in order to release the locked mold 1 (7d). The mold holder of the second type 60 having released the locked mold 1 continues its rotation with the wheel to receive a mold 1 containing a formed container, as will be described later.

The locked mold 1 released by the mold holder of the second type 60 is picked up by a mold holder of the first type 58 carried by a transfer wheel, as shown by reference 7e of FIG. 7. At this station, the pitch between successive molds is changed such that the molds are closer to each other. This change of pitch, allowing an increased throughput of the machine, is possible because the mold holders of the first type 58 require less space than the mold holders of the second type 60 since the mold holders of the first type 58 do not comprise movable jaws as the mold holders of the second type 60.

The mold 1 carried by the transfer wheel is moved to the forming station, where it is picked up by a mold holder of the first type 58 provided on the wheel of the forming station (reference 7f). According to the embodiment shown in FIG. 7, a holding element 72 is then placed on the arm 62 of the mold holder of the first type 58 in order to hold the mold 1 radially (7g). The forming of the container 2 occurs during the rotation of the wheel, as shown by reference 7h. Once the container 2 is formed, and in the hydraulic forming method, filled (reference 7i), the holding element 72 is retrieved from the arm 62 (7j) and the mold 1, containing a formed and filled container 2, is transferred to a capping station, where it is picked up by another mold holder of the first type 58 (7k and 7l).

At the capping station, the mold holder of the first type 58 is closed (7m) and a cap is placed on the container 2 (7n). The capped container 2 is then picked up by a mold holder of the first type 58 provided on another transfer wheel (7p), which transfers the mold 1 to an opened mold holder of the second type 60 of the loading station (7q), which also forms an unloading station. The transfer wheel changes the pitch in order to adapt it to the pitch of the loading station.

Figure 8:
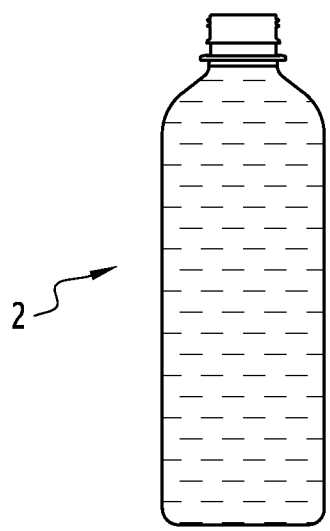
FIG. 8 is diagrammatical view of a filled container at the end of the method shown in FIG. 7.

The mold holder of the second type 62 closed around the mold 1 containing a filled and capped container 2 (7r) and the locking element 40 is disengaged from the first and second parts 18 and 20 (7s). The mold 1 is placed in its opened configuration by the jaws 74 (7t) and the filled and capped container 2, seen in FIG. 8, is retrieved from the mold 1 (7u). The mold holder of the second type 62, with the opened mold 1, continues its rotation, and a new preform 4 is loaded in the mold 1 (7v).

As mentioned previously, other stations can be provided, such as a station for pre-treating the preforms 4, for example to decontaminate or clean the preforms or a station for retrieving soiled molds from the unloading station in case of accidental leaking of a container.

As mentioned previously, the method described above is given as way of a non-limiting example. In a known manner, the machine and the method can be adapted to perform a blow forming method of the containers.

As mentioned previously, various types of containers can be produced with the mold 1, simply by changing the locking element 40 and by keeping the same first and second parts 18 and 20.

The method and the machine can also be adapted to produce other hollow bodies than containers 2.

The mold and the machine disclosed above are very compact since the locking of the mold is obtained by a compact and simple locking element rather than with locking means provided on the mold holders. As described previously, the throughput of the machine can be improved since more mold holders can be arranged on one wheel because of the simple structure of said mold holders, which do not comprise complicated means to lock the molds.

The invention claimed is:

1. A mold for molding a hollow body from a preform of said a hollow body, the mold comprising a first part and a second part cooperating to define a molding cavity having the shape of the hollow body to be molded, said parts being movable relative to each other between an opened configuration of the mold, wherein the preform can be loaded inside the molding cavity, and a closed configuration of the mold, wherein the molding cavity is formed, the mold further comprising a locking element arranged to maintain the mold in its closed configuration in a locked position of the mold, the locking element including at least a sleeve portion, said sleeve portion being arranged around a portion of the first and second parts in the closed configuration such that said sleeve portion surrounds the portion of the first and second parts and prevents the mold from moving towards its open configuration in the locked position of the mold, the first and second parts defining a cylindrical outer contour in the closed configuration, the sleeve portion having an inner opening having the shape of a portion of the cylindrical outer contour and being substantially complementary to the portion of the first and second parts it surrounds in the locked position.

2. The mold according the claim 1, wherein the locking element further comprises a bottom portion, the bottom portion closing the sleeve portion at one end thereof, the first and second parts resting on said bottom portion in the locked position.

3. The mold according to claim 2, wherein the bottom portion defines a part of the molding cavity and closes said molding cavity in the locked position.

4. The mold according to claim 3, wherein the hollow body to be molded is a container having a neck, a body and a bottom, and wherein hollow recesses of the first and second parts, when in closed configuration, define a shape of the body of the container and the bottom portion includes a bottom face having a shape of the bottom of the container to be formed.

5. The mold according to claim 3, wherein the first and second parts each include a hollow recess having a shape of a part of the hollow body to be produced, the hollow recesses of said first and second parts facing each other and defining together the molding cavity of the mold in the closed configuration.

6. The mold according to claim 1, wherein at least one of the first and second parts includes at least one first groove extending on an outer face of the at least one of the first and second parts at a location outside of the portion surrounded by the sleeve portion, and the sleeve portion of the locking element comprising at least one second groove extending on the outer face of said sleeve portion, the first and second grooves being configured to cooperate with a mold holder in order to maintain the mold in the locked position.

7. A machine for producing a hollow body from a preform, the machine comprising at least one mold holder of a first type and at least one mold, wherein the at least one mold defines a molding cavity having a shape corresponding to the hollow body to be molded and comprises a first part and a second part, said first and second parts being movable relative to each other between an opened configuration wherein the preform can be loaded inside of the molding cavity and a closed configuration wherein the molding cavity is defined, the at least one mold further comprising a locking element configured to maintain the at least one mold in its closed configuration in a locked position of the mold, the locking element comprising a sleeve portion, in the closed configuration said sleeve portion being positioned around a portion of the first and second parts such that said sleeve portion surrounds said portion of the first and second parts and prevents the mold from moving towards its opened configuration while in the locked position of the mold, and
wherein the mold holder of the first type has at a free end an imprint adapted to receive and retain the sleeve portion of the locking element of the mold around a portion of the first and second parts of the mold in the closed configuration in order to maintain the mold in its locked position.

8. A machine comprising:
a mold defining a molding cavity defining a shape of a hollow body to be molded therein and including a first part and a second part, said first and second parts being movable relative to each other between an opened configuration of the mold wherein a preform can be loaded inside the molding cavity, and a closed configuration of the mold, wherein the molding cavity is formed, the mold further comprising a locking element maintaining the mold in its closed configuration in a locked position of the mold, the locking element comprising at least a sleeve portion, said sleeve portion being arranged around a portion of the first and second parts in the closed configuration such that said sleeve portion surrounds said portion of the first and second parts and prevents the mold from moving towards its open configuration in the locked position of the mold, wherein the first and/or the second parts further include at least one first groove extending on the outer face of the mold in the closed configuration outside the portion surrounded by the sleeve portion, and the sleeve portion of the locking element further comprising at least one second groove extending on the outer face of said sleeve portion; and
a mold holder comprising at least a first protrusion and a second protrusion, the first and second protrusions engaging the first and second grooves when the mold is carried by the mold holder to axially retain the mold in the mold holder in an axial direction of the mold and to maintain the mold in its locked position.

9. The machine according to claim 7, wherein the mold holder is mounted on a wheel movable in rotation around an axis substantially parallel to an axial direction of the mold.

10. The machine according to claim 9, wherein the mold holder further comprises a holding element engaging the mold in the mold holder and configured to retain the mold in the mold holder in a radial direction of the wheel.

11. The machine according to claim 10, wherein the holding element comprises a sleeve, movable between an unlocking position wherein the mold can be introduced in the sleeve and a locking position wherein the sleeve surrounds the mold in order to prevent its movement according to a radial direction of the wheel.

12. The machine according to claim 7, further comprising at least one mold holder of a second type, said mold holder of a second type comprising two jaws movable relative to each other and arranged to cooperate with the first and second parts respectively, the two jaws being able to move the first and second parts between the opened and closed configuration of the mold.

13. The machine according to claim 7, wherein the machine is a machine for producing containers from preforms and comprising at least a container forming station for forming the containers, the container forming station comprising an injection head configured to inject a gaseous or liquid forming fluid inside the preforms placed in molds such that the injection of the fluid deforms the preforms to acquire the shape of the molding cavity, the container forming station including a plurality of mold holders.

14. The mold according to claim 1, wherein the first and second parts define an outer contour having a lower portion and an upper portion, the upper portion of the outer contour extending above the sleeve portion in said locked position of the mold.

15. The mold according to claim 14, wherein the lower portion and the upper portion are joined together by a shoulder extending substantially radially, wherein the sleeve portion comprises an inner opening and is arranged around the lower portion of the outer contour and wherein the lower portion of the outer contour is engaged in the inner opening and the shoulder comes into abutment on an upper end of the inner opening such that the upper portion of the outer contour extends above the sleeve portion in said locked position of the mold.

16. A mold assembly for molding a hollow body from a preform, said mold assembly including a mold defining a molding cavity having the shape of the hollow body to be molded and comprising a first part and a second part, said first and second parts being movable relative to each other between an opened configuration of the mold, where the preform can be loaded inside the molding cavity, and a closed configuration of the mold, where the molding cavity is formed and wherein the first part and the second part define an outer contour having a lower portion and an upper portion joined together by a shoulder extending substantially radially, the mold assembly further comprising a locking element arranged to maintain the mold in its closed configuration in a locked position of the mold, the locking element comprising at least a sleeve portion comprising an inner opening opened at an upper end of the sleeve portion, wherein said sleeve portion is arranged around the lower portion of the outer contour in the closed configuration such that said sleeve portion surrounds said lower portion and prevents the mold from moving towards its open configuration in the locked position of the mold, the lower portion of the outer contour being engaged in the inner opening and the shoulder coming into abutment on the upper end of the inner opening such that the upper portion of the outer contour extends above the sleeve portion in said locked position of the mold.

17. The machine according to claim 7, wherein the machine is a machine for producing containers from preforms, and comprises at least a container forming station for forming the containers, said container forming station comprising means for injecting a liquid forming fluid inside the preforms placed in molds such that the injection of the fluid deforms the preforms, which acquire the shape of the molding cavity, said forming station including a plurality of mold holders.

* * * * *